Nov. 7, 1950

P. H. CHIN ET AL 2,528,688

THYRATRON CONTROL SYSTEM

Filed March 1, 1948

Light Load at one Particular Speed.

INVENTORS
BERTHOLD A. KNAUTH
AND PAO H. CHIN
BY
Semmes, Keegin, Robinson & Semmes
ATTORNEYS Nov. 7, 1950 P. H. CHIN ET AL 2,528,688
THYRATRON CONTROL SYSTEM
Filed March 1, 1948 2 Sheets-Sheet 2

50% Torque at same speed.

100% Torque at same speed

INVENTORS
BERTHOLD A. KNAUTH
AND PAO. H. CHIN.
BY
Semmes, Keegin, Robinson & Semmes
ATTORNEYS Patented Nov. 7, 1950

2,528,688

UNITED STATES PATENT OFFICE 2,528,688

THYRATRON CONTROL SYSTEM

Pao Hsiung Chin, Cranford, N. J., and Berthold A. Knauth, Bolton, N. Y., assignors, by direct and mesne assignments, to The Motorspeed Corporation, New York, N. Y.

Application March 1, 1948, Serial No. 12,321

3 Claims. (Cl. 318—331)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

In controlling the firing of thyratron tubes which are grid-controlled gaseous discharge devices that permit the passage of current in only one direction, there are several factors which, in general, effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) The simultaneously occurring anode-to-cathode potential of the tube which is the net instantaneous algebraic sum of all the voltages applied to the anode, which in this instance includes both the alternating supply voltage and the counter E. M. F. of the motor armature.

An object of this invention is to provide an electronic motor speed regulator functioning to provide an adjustable and variable voltage for the armature circuit of a direct-current motor in such a manner that the speed of the motor may be pre-set at any value from zero speed to the maximum speed at which this motor is capable of running in this circuit.

Another object of this invention is to provide an electronic motor speed regulator with which the speed of the motor may be caused, automatically, to remain essentially constant at the pre-set value.

A further object of this invention is to provide an electronic motor speed regulator in which the no-load speed of the motor is determined by the magnitude of an adjustable reference potential with which the armature counter E. M. F. is compared.

Yet a further object is to provide a system for regulating motor speed as heretofore set forth, which will give substantially all the performance when loaded that can be obtained at no-load speeds.

Still another object of this invention is to provide a system for regulating motor speed so as to maintain the motor speed at a pre-set value when the load on the motor varies.

Another object is to provide a circuit for industrial applications where it is desirable not only to be able to adjust the no-load speed of a motor but also to maintain the motor speed at a pre-set value when the load on the motor varies.

Other and further objects of this invention will be apparent to those skilled in the art to which it relates from the following specification, claims and drawing.

A schematic diagram illustrating the basic principles of this electronic motor speed regulator is shown in Figure 1.

Figure 1:
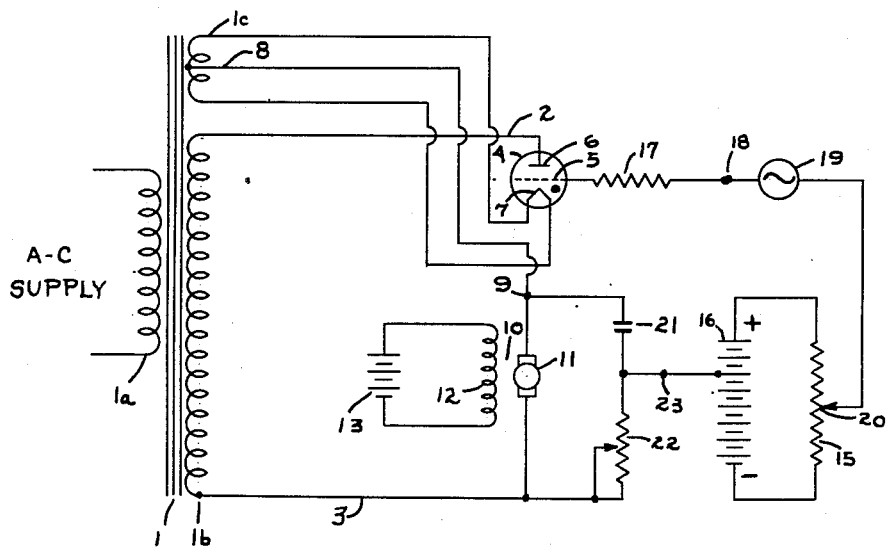

The power source for this circuit is of the essentially constant voltage alternating potential type. The primary $1a$ of the transformer $1$ is connected to this power source and the secondary windings $1b$ and $1c$ are inductively coupled to the aforesaid primary.

Connected in series relation to the terminals 2 and 3 of transformer secondary $1b$ are a rectifier 4 of the grid-controlled, gaseous discharge type and an armature 11 of a separately excited direct current motor 10. The rectifier 4 has a control grid 5, an anode 6, and a filament 7 which is heated by power supplied from the transformer secondary winding $1c$, the center tap 8 of which is connected to armature 11 of the motor 10. The separately excited field 12 of motor 10 is energized from a direct potential source 13.

A capacitor 21 and an adjustable resistor 22, in series connection, are connected to the junction 9 of armature 11 and filament or cathode 7, of rectifier 4. Tap 23 of the direct potential source 16 is connected to the junction of capacitor 21 and resistor 22. Thus, the grid circuit includes, in series connection, the grid 5 of the rectifier 4; a grid current limiting resistor 17; an essentially constant-potential alternating potential source 19, the potential of which is approximately 90 electrical degree lagging in phase relationship with respect to the potential of power source $1b$, and is much smaller in magnitude than the potential of power source $1b$, an essentially constant-potential direct potential source 16 and a potentiometer 15 in bridge arrangement such that the magnitude and polarity of the direct potential introduced into the grid circuit may be adjusted by moving the slider 20 of potentiometer 15; capacitor 21 which provides a potential, the wave form of which is derived from the wave form of the armature potential; and, the filament 7 of rectifier 4. The wave form of the potential across capacitor 21 may resemble the wave form of the armature potential in that, after conduction of the rectifier has ceased, it approaches the counter E. M. F. of the armature but from a different starting point and in a different shape. The wave form of the potential across capacitor 21 may be varied by changing the resistance value of resistor 22. It has been found that with a proper combination of the values of capacitor 21 and of resistor 22 relative to the magnitude of the A. C. quadrature voltage 19, the speed of the motor may be made to remain at any pre-set value, while the load on the motor is varied from no-load to the maximum load which the motor is capable of carrying in this circuit.

Figure 2:
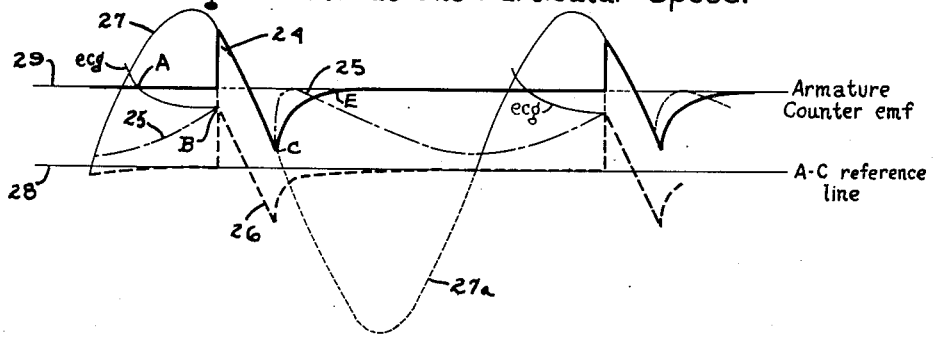
Figure 2 illustrates voltage wave forms of voltages across different parts of the circuit shown in Figure 1 for light load on the motor.
Figure 3:
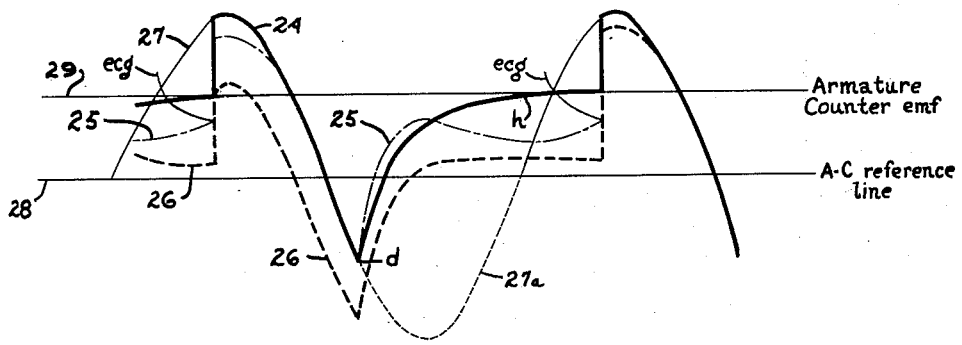
Figure 3 illustrates voltage wave forms of voltages across different parts of the circuit shown in Figure 1 for approximately 50% rated torque.
Figure 4:
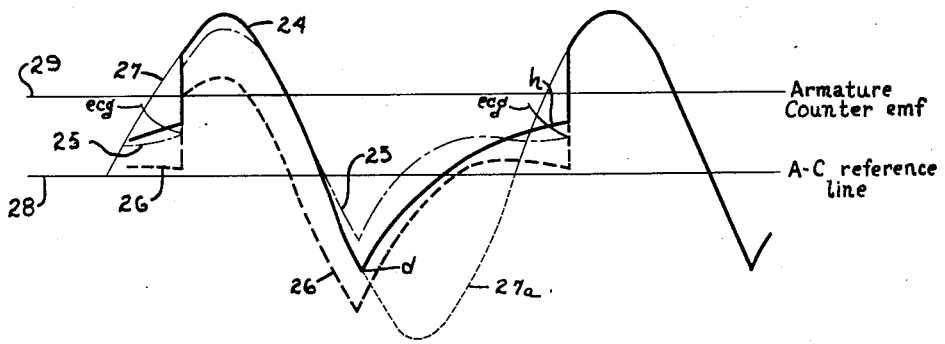
Figure 4 illustrates voltage wave forms of voltages across different parts of the circuit shown in Figure 1 for approximately 100% rated torque.

The wave forms for several operating conditions of the circuit of Figure 1 are shown in Figures 2, 3 and 4 for light load, 50% torque and 100% torque, respectively. In these figures, curves marked 24 are the potential across the armature 11 referred to the terminal 3 which is line 28, curves marked 25 are that portion of the grid potential between the points 3 and 18, curves marked 26 are the potential between points 3 and 23, and curves marked $e_{cg}$ are the critical grid voltage curves.

In Figures 2, 3 and 4 the zero reference line of the alternating current potential wave 27 across the terminals 2 relative to 3 of the secondary 1b is designated by the horizontal line 28. The positive half-cycles of the alternating potential are designated by the full 27, and the negative half-cycles below the zero reference line 28 are designated by the broken line 27a. The armature counter E. M. F., which can be considered a direct voltage, generated by the armature 11 is designated by the horizontal line 29 and positioned above the zero alternating current reference line 28 so as to indicate that the E. M. F. opposes the voltage applied to the armature 11 through the thyratron 4 from the secondary 1b.

The grid potential curve 25 represents the algebraic sum of the potentials applied between the terminal 3 of the secondary and the point 18 between the grid current limiting resistor 17 and the phase adjusted alternating current potential supply 19. The grid potential curve 25, therefore, represents the voltage drop across the variable resistor 22, a portion of the direct current supply 16 as selected by the potentiometer 15, and the A. C. supply 19.

It will be observed that the shape of this grid potential curve 25 follows the shape of the alternating potential 19 (not shown) except during the intervals when the thyratron 4 conducts and causes the voltage of armature 11 to be distorted, as shown by sections of the armature potential curve 24. During the intervals of these pulses the potential represented by the curve 25 has a tendency to assume the wave form of the armature potential curve 24.

The curve $e_{cg}$ represents the critical grid voltage of the thyratron, and where this curve is intersected by the grid potential curve 25, that is, the curve representing the algebraic sum of the various grid voltages, the thyratron fires and passes a current pulse through the armature 11 of the motor.

The curve 26 represents simply the potential across the resistor 22, and it will be observed that during the intervals when current passes through the motor armature, the shape of the curve 26 in general follows the shape of the armature potential curve 24. Curve 26, of course, differs from curve 25 inasmuch as curve 25 includes the alternating potential of the source 19 plus the direct potential of a portion of the direct current supply 16.

Prior to firing of the thyratron 4, the cathode, as represented by the cathode's electrical neutral, mid-point 8, is biased upward by the counter E. M. F. voltage of armature 11 measured from a reference level 3, corresponding to reference line 28 in Figures 2, 3 and 4. Applied to the anode 6 of thyratron 4 is an alternating potential 1b also measured upward, when line 2 is positive relative to line 3 from the reference level 3, and downward when line 2 is negative relative to line 3.

When the current flow is neither into nor out of the armature 11, and hence is zero, the voltage across the armature terminals 9—3 is assumed, in theory, to be only the direct potential E. M. F. of the armature conductors rotating at a constant speed thru a field of constant magnetic flux, so this counter E. M. F. is represented as a constant voltage by a horizontal line 29 relative to base line 28 shown in Figures 2, 3 and 4.

When the circuit is to be used as a speed regulator, utilizing the counter E. M. F. of the armature 11, during intervals of zero current flow in these conductors, as a measure of speed, this counter E. M. F. is compared with a standard or reference potential obtained from the source 16, and any difference between the reference value and the counter E. M. F. value is used to control the time of firing of the thyratron 4. If the thyratron 4 were to fire at time of zero grid-cathode potential, it would already be fired just after point A on Figure 2, beyond which the critical characteristic $e_{cg}$ of the tube demands that the grid-cathode voltage be negative to prevent firing.

To prevent premature firing near point A in Figure 2 another component of grid-cathode voltage is needed. This is the 90 degree lagging A. C. component of source 19 which is included in the voltage indicated by the curve 25. Thus, the grid-to-cathode voltage of the thyratron 4 is more negative than the required grid-to-cathode voltage value until point B on curve 25 is reached, at which point the thyratron fires.

For automatic regulation of speed, the reference voltage derived from the source 16 through potentiometer 15 is not changed; that value has been pre-set for the desired speed level. The quadrature 90 degree lagging A. C. component from the source 19 is fixed in phase angle and in magnitude so the only voltage remaining is the counter E. M. F. which is a measure of speed. Hence, to turn the thyratron more on or more off as might be required by variations in the A. C. potentials or by load conditions on the motor, the speed of the armature 11 would have to change however slightly.

The amount of speed change necessary to turn the thyratron full off is an increase of such magnitude as to raise the cathode level of the thyratron to the extent that the critical grid voltage characteristic of the thyratron is cut by the sum of the reference voltage from source 16 plus the 90 degree lagging A. C. voltage from source 19 near the peak additive sum of the two components. Now, conversely, to turn the thyratron full on would necessitate a speed decrease such as to lower the cathode level of the thyratron 4 so that the critical characteristic is cut by the subtraction of the reference voltage from source 16 minus the peak value of source 19 near the peak additive difference of the two components. Thus the change in counter E. M. F. necessary to effect firing from full on to full off is a function of the peak-to-peak amplitude of the 90 degree lagging A. C. component; the smaller this amplitude the less change required and vice versa.

Practical considerations limit the minimum value of this 90 degree lagging A. C. component to something appreciably more than zero. It is a feature of this control that it maintains a relatively constant speed even though the firing point of the thyratron 4 must vary to accommodate the different requirements of a change in load on the motor.

This condition is brought about by taking advantage of an electro-magnetic characteristic of armature terminal voltage whereby this voltage does not collapse to counter E. M. F. level instantly at the time of current zero but rather collapses toward counter E. M. F. level in an exponential manner as shown between the points C and E of Figure 2. In theoretical considerations, at current zero the $$L\frac{di}{dt}$$

voltage would be zero and the IR drop would be zero, hence the only voltage remaining between the armature terminals would be the counter E. M. F. due to induced voltage action of the conductors cutting flux.

The nature of this voltage decay after current zero seems to be dependent on the average value of the current which has been flowing in the armature conductors; the more current the more noticeable the exponential effect and the longer its duration; the less the current, the less of this exponential behaviour and the quicker the collapse of the counter E. M. F. value. This is illustrated in Figures 3 and 4 by the sections of the armature voltage curves between points $d$ and $h$. Thus, the armature terminal voltage acts as though something were trapping flux around the armature conductors and allowing this flux to decay slowly as though by a short circuiting turn or by a resistor shunting the ideal inductor. This exponential effect is attributed to eddy currents in the iron of the magnetic circuit. Observations have shown the effect to vary in proportion as the armature current. So far as the electronic circuit is concerned, this exponential decay of armature terminal voltage has the effect of causing the thyratron to fire sooner than the other unchanging components of grid-cathode voltage would dictate. And, since the amount of this exponential effect is a function of armature current it makes available a thyratron "turn-on" effect that is a function of the load.

The amount of this "turn-on" effect proportional to current may be more than adequate to just compensate for load conditions and may actually cause so much advance in the thyratron firing angle as to cause the speed of armature 11 to rise as a function of increased load. An increase in 90 degree lagging A. C. component from source 19 would off-set this excess turn-on effect, but only at certain speeds with deficient or excess effect at other speeds.

To produce the correct amount of compensation for load current, at all speed levels, one solution is to modify the armature terminal voltage when it is used as a measure of speed. This is done by connecting a capacitor 21 in series with a resistor 22 across the armature terminals, the capacitor being connected to the cathode end of the armature. The capacitor voltage is utilized as an indication of the armature speed instead of the whole armature terminal voltage.

The capacitor 21 tends to assume an average potential which is the direct current component of the voltage wave, namely, counter E. M. F. plus the IR drop, and has a pulsating voltage which ripples around this average level in a shape and magnitude dependent on the ratio of the resistance of the resistor 22, which tries to absorb all of the deviations from the average, to the capacity of the capacitor 21, which tries to maintain the average without ripple. Therefore, it is possible, through the adjustment of the relative values of resistor 22 and capacitor 21, to obtain a voltage wave form of the correct shape and magnitude relative to magnitude of quadration lagging component 19, to afford automatic compensation for changes in load to maintain constant speed of the motor armature 11.

The amount of the potential of the direct current supply 16 that is employed to pre-set the desired speed level is selected by the potentiometer 15 so that the firing angle of the thyratron 4 may be adjusted accordingly by moving the contactor or slider 20 of the potentiometer 15. By manipulating the slider 20 so as to cause the thyratron to fire earlier in the cycle, the operator may cause a larger current to flow through the armature of the motor as required by operation at a higher speed or increased load at the former speed. This latter condition is illustrated by the curves in Figure 3 where it will be observed that the grid potential curve 25, which represents the algebraic sum of the various grid voltages, intersects the critical grid voltage curve $e_{cg}$ earlier in the cycle because the change in wave form of the voltage across the armature and hence across the thyratron caused a change in the critical grid voltage characteristic.

Comparing the pulses in the armature potential curve 24 as applied to the armature 11 by the thyratron 4, as shown in Figure 3 with the corresponding pulses shown in Figure 2, it will be observed that the armature potential as illustrated in Figure 3 was greatly increased over that illustrated in Figure 2 and the tube conducts into a greater portion of the negative half-cycle of supply voltage.

In Figure 4 the wave forms of the various potentials corresponding to a 100% torque condition are illustrated. Here the firing angle of the thyratron is still further advanced in the cycle so that current is supplied to the armature 11 of the motor through substantially the entire available portion of the positive half-cycle of the alternating current wave and into a substantial part of the negative half-cycle of the supply voltage as shown by the portion of the curve 24 appearing below the zero line 28 down to point $d$. The firing of the thyratron 4 under the conditions illustrated by the curves in Figure 4 is also controlled by the intersection of the grid potential curve 25 with the critical grid voltage curve $e_{cg}$ as was the case in Figures 2 and 3.

It will be observed that in Figure 4 the curve $e_{cg}$ dips below the counter E. M. F. line 29 substantially further than the corresponding curve $e_{cg}$ of Figure 3. This is caused by the change in wave form across the terminals of the armature when heavier currents required by the loading of the motor were passed through the motor. As a result, the grid potential curve 25 may intersect with the critical grid voltage curve $e_{cg}$ earlier in the cycle without an increase in the positive voltage supplied from the source 16 through the potentiometer 15. The curve 26 which represents the potential across the variable resistor 22 dips down below the zero reference line 28 during an interval corresponding to a similar dip in the armature potential. During this interval up to point $d$ the armature 11 is yet carrying current at a time when the A. C. supply voltage to thyratron 4 is negative, and this is caused by the inductive effects of the motor windings.

While we have shown my system as applied to a motor speed control, it will be obvious that the system is useful in many other connections, and that the immediate application has been illustrated and described merely to illustrate the invention. We desire that my invention be limited only by the scope of the appended claims and the showing of the prior art.

I claim:

1. A thyratron control circuit for direct current motors comprising a thyratron having an anode, a grid and a cathode, a motor having an armature connected in series with said thyratron across an alternating current supply, a capacitor having one terminal thereof connected to the side of said armature connected to said cathode, a resistor having one terminal thereof connected to the other side of said armature, the other terminal of said resistor being connected to the other terminal of said capacitor and to the grid of said thyratron, said resistor and said capacitor having values such that the speed of said armature may be made to remain substantially at a pre-set value while the load on said motor is varied from no-load to substantially full load.

2. A thyratron control circuit for direct current motors comprising a thyratron having an anode, a grid and a cathode, a motor having an armature connected in series with said thyratron across an alternating current supply, a source of alternating current supply out of phase with said first mentioned alternating current supply connected to said thyratron grid, a capacitor having one terminal thereof connected to said cathode and to one side of said armature, a resistor having one terminal thereof connected to the other side of said armature, the other terminal of said resistor being connected to the other terminal of said capacitor and to said last mentioned source of alternating current supply, said resistor and said capacitor having values such that the speed of said armature may be made to remain substantially at a pre-set value while the load on said motor is varied from no-load to substantially full load.

3. A thyratron control circuit for direct current motors comprising a thyratron having an anode, a grid and a cathode, a motor having an armature connected in series with said thyratron across an alternating current supply, a source of alternating current supply out of phase with said first mentioned alternating current supply connected to said thyratron grid, a capacitor having one terminal thereof connected to said cathode and to one side of said armature, a resistor having one terminal thereof connected to the other side of said armature, a source of D. C. potential connected to the other terminal of said resistor and to the other terminal of said capacitor, a potentiometer connected across said source of D. C. potential, and connections for connecting the variable contact of said potentiometer to the grid of said thyratron, said resistor and said capacitor having values such that the speed of said armature may be made to remain substantially at a pre-set value while the load on said motor is varied from no-load to substantially full load.

PAO HSIUNG CHIN.
BERTHOLD A. KNAUTH.

REFERENCES CITED

The following references are of record in the file of this patent:

UNITED STATES PATENTS

| Number | Name | Date |
|---|---|---|
| 2,082,496 | Howe | June 1, 1937 |
| 2,236,086 | Conover | Mar. 25, 1941 |